(12) United States Patent
Trent

(10) Patent No.: US 10,674,446 B1
(45) Date of Patent: Jun. 2, 2020

(54) SLEEP/WAKE BASED ON COVERAGE

(71) Applicant: Architecture Technology Corporation, Eden Prairie, MN (US)

(72) Inventor: Barry A. Trent, Chanhassen, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 1 day.

(21) Appl. No.: 15/973,870

(22) Filed: May 8, 2018

(51) Int. Cl.
*H04M 1/00* (2006.01)
*H04W 52/02* (2009.01)
*H04W 4/02* (2018.01)

(52) U.S. Cl.
CPC ......... *H04W 52/0225* (2013.01); *H04W 4/02* (2013.01)

(58) Field of Classification Search
USPC ............... 455/574, 434, 458; 370/331, 311
See application file for complete search history.

(56) References Cited

U.S. PATENT DOCUMENTS

| | | | |
|---|---|---|---|
| 6,868,314 B1* | 3/2005 | Frink | B64C 1/00 701/3 |
| 9,107,046 B2* | 8/2015 | Putman | H04M 1/72577 |
| 9,685,088 B2 | 6/2017 | Trent et al. | |
| 2006/0094450 A1* | 5/2006 | Park | H04W 52/0225 455/458 |
| 2010/0195552 A1* | 8/2010 | Ho | H04W 52/0216 370/311 |
| 2014/0099949 A1* | 4/2014 | Godor | H04W 52/0206 455/434 |
| 2015/0245270 A1* | 8/2015 | Wu | H04W 52/0206 370/331 |
| 2016/0330682 A1* | 11/2016 | Trainin | H04W 52/0206 |
| 2018/0037336 A1* | 2/2018 | Rammos | H04W 84/005 |

* cited by examiner

*Primary Examiner* — David Q Nguyen
(74) *Attorney, Agent, or Firm* — Carlson, Caspers, Vandenburgh & Lindquist, P.A.

(57) ABSTRACT

Embodiments for a module for scheduling sleep/wake intervals for a first one or more communication devices are disclosed. The module includes a computer readable medium having instructions thereon. The instructions, when executed by one or more processing devices, cause the one or more processing devices to obtain a coverage prediction for the first one or more communication devices. The coverage prediction indicates intervals during which a second one or more communication devices are predicted to be within range of the first one or more communication devices. The instructions also cause the one or more processing devices to generate sleep intervals and wake intervals for the first one or more communication devices based on the coverage predictions.

20 Claims, 12 Drawing Sheets

US 10,674,446 B1

SLEEP/WAKE BASED ON COVERAGE

BACKGROUND

Conservation of battery power is an important concern for any battery powered communication device. A traditional approach to battery conservation for a communication device is to use sleep/wake cycles that allow battery powered radios to decrease energy while "sleeping". The timing of the sleep and wake intervals for a group of communication devices can be synchronized so that all the communication devices in the group wake at a prescribed time to communicate with each other and then sleep until the next synchronized wake interval.

BRIEF DESCRIPTION

Embodiments for a module for scheduling sleep/wake intervals for a first one or more communication devices are disclosed. The module includes a computer readable medium having instructions thereon. The instructions, when executed by one or more processing devices, cause the one or more processing devices to obtain a coverage prediction for the first one or more communication devices. The coverage prediction indicates intervals during which a second one or more communication devices are predicted to be within range of the first one or more communication devices. The instructions also cause the one or more processing devices to generate sleep intervals and wake intervals for the first one or more communication devices based on the coverage predictions.

Embodiments for a method for scheduling sleep/wake intervals for a first one or more communication devices are also disclosed. The method includes obtaining a coverage prediction for the first one or more communication devices. The coverage prediction indicates intervals during which a second one or more communication devices are predicted to be within range of the first one or more communication devices. The method also includes generating sleep intervals and wake intervals for the first one or more communication devices based on the coverage predictions.

Embodiments for another method for scheduling sleep/wake intervals for a first one or more communication devices are also disclosed. The method includes generating a coverage prediction for the first one or more communication devices. The coverage prediction indicates intervals during which a second one or more communication devices are predicted to be within range of the first one or more communication devices. The method also includes generating sleep intervals and wake intervals for the first one or more communication devices based on the coverage predictions. Indications of the sleep intervals and wake intervals are sent to the first one or more communication devices. Sleep/wake of the first one or more communication devices is controlled in accordance with the sleep intervals and wake intervals.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
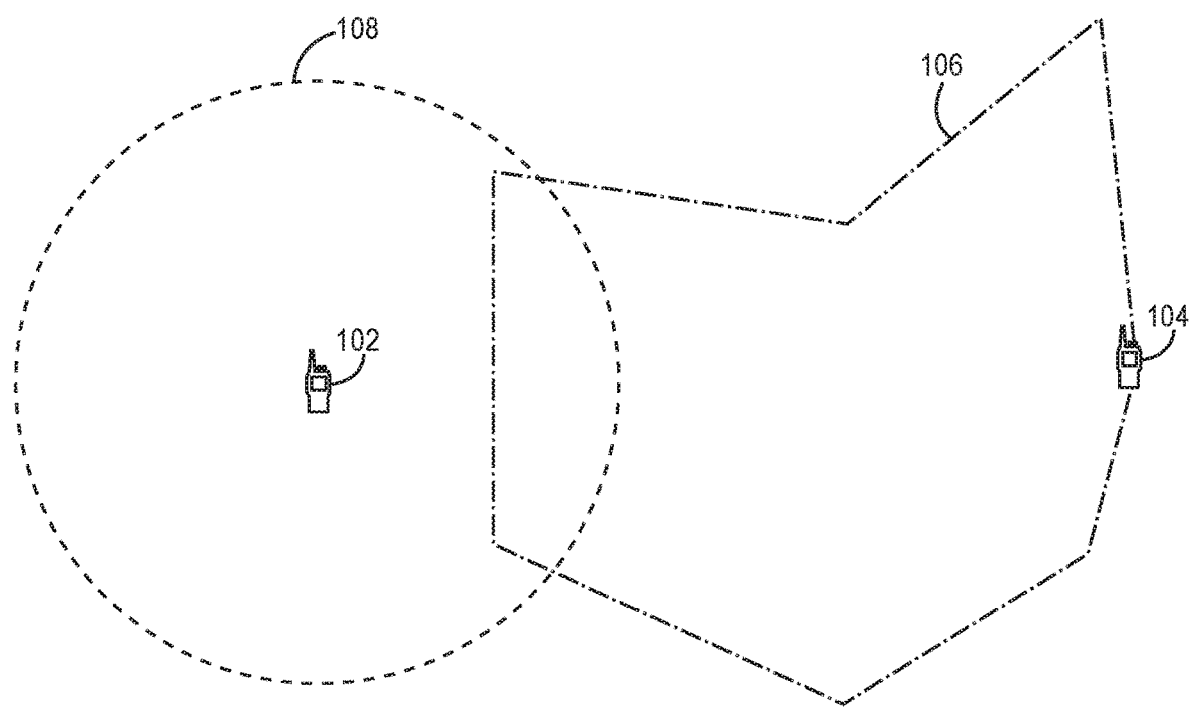
FIG. 1 is a block diagram of an example first communication device that operates sleep and wake intervals based on when a second communication device is within communication range thereof.

FIG. 1 is a block diagram of an example first communication device 102 that operates sleep and wake intervals based on when a second communication device 104 is within communication range thereof. In some situations, two devices that communicate with one another are only within communication range of each other during certain times. FIG. 1 illustrates such a situation. The first device 102 of FIG. 1 is generally stationary and the second device 104 travels on a path 106. The path 106 of the second device 104 brings the second device 104 into and out of communication range 108 of the first device 102. In this example, the second device 104 travels in a loop, moving along the same path 106 in each loop, so that the second device 104 periodically comes into communication range 108 of the first device 102. Because of this looping travel of the second device 104 and the stationary nature of the first device 102, future locations of both the first device 102 and the second device 104 can be predicted. Based on these known future locations, a coverage prediction can be generated that indicates during which intervals the first and second communication devices 102, 104 are expected to be in communication range 108 of one another.

An interval during which a first device is predicted to be in communication range of a second device based on their predicted future locations, is referred to herein as a "coverage interval" or more specifically a "second device coverage interval" for the first device. An interval during which a first device is predicted to be out of communication range of a second device based on their predicted future locations, is referred to herein as a "non-coverage interval" or more specifically a "second device non-coverage interval" for the first device. As should be understood, the first device and second device can communicate with more than one other device, such that the first device can have a second device coverage interval, a third device coverage interval, and a fourth device coverage interval. Each such coverage interval is the period during which the first device is in communication range of the respective other device (second, third, fourth), and each such coverage interval can the same or different than the other coverage intervals.

The coverage prediction for a first device can describe the coverage intervals for one other device, or for more than one other device. That is, the coverage prediction for a first device can indicate the intervals in which one or more other devices are predicted to be in communication range of the first device. Each of the one or more other devices can have distinct (i.e., their own) coverage intervals indicated in the coverage prediction, or the coverage prediction can indicate intervals in which all of a group of other devices are predicted to be within communication range. In an example, the coverage prediction for a first device can describe the coverage intervals for all other communication devices with which it is desired that the first device communicate. In another example, the coverage prediction for a first device can describe the coverage intervals for all other devices that have a coverage interval with respect to the first device.

As used herein a coverage prediction, coverage interval, non-coverage interval, communication range, or other communication related term for a device is with respect to a transceiver of that device. For example, a communication range for a first device is a communication range of a transceiver of the first device. Likewise, a coverage prediction for a first device is an indication of when other devices (transceivers thereof) are predicted to be within communication range of a transceiver of the first device. Accordingly, it should be understood that references to communication related items of a first device, refer to a transceiver of that first device.

Based on the coverage prediction for the first device 102, sleep/wake intervals for a transceiver of the first device 102 can be determined. In particular, the sleep/wake intervals can be coordinated with the coverage prediction such that the transceiver is awake when devices are in communication range and asleep when devices are out of communication range. By coordinating the sleep/wake intervals in such a manner, battery power of the first device 102 can be efficiently utilized by limiting the time during which the transceiver is awake, but unable to communicate because other devices are out of range.

Figure 2:
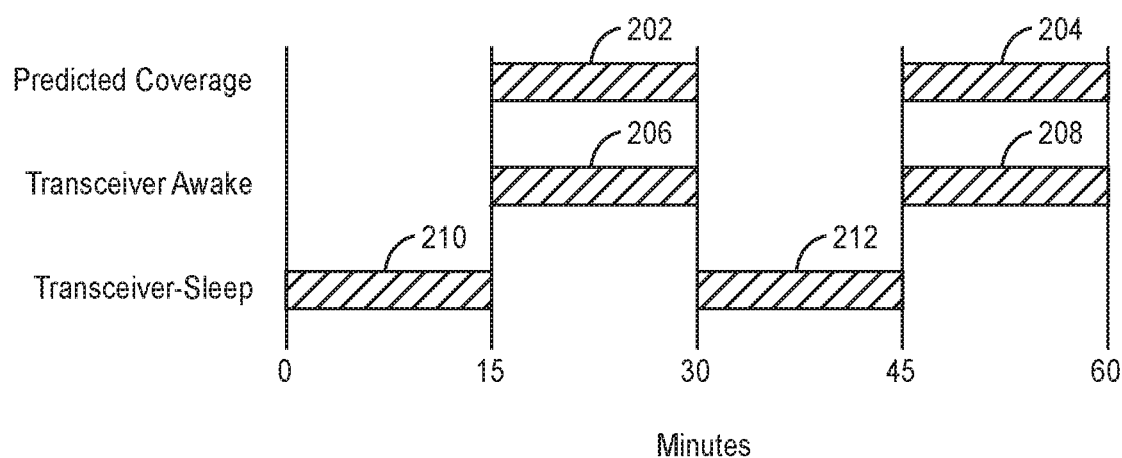
FIG. 2 is a graph illustrating example coverage intervals and sleep and wake intervals for the first communication device of FIG. 1 with respect to coverage intervals of the second communication device of FIG. 1.

FIG. 2 is graph illustrating example second device coverage intervals and sleep and wake intervals for the first device 102. In this example, the loop implemented by the second device 104 results in periodic coverage intervals 202, 204 of the first device 102. The periodic coverage intervals 202, 204 occur every half hour for fifteen minutes. There is a fifteen-minute non-coverage interval between each coverage interval 202, 204. In this example, the transceiver of the first device 102 is to communicate with no devices other than the second device 104 during the 60-minute time period shown. Accordingly, the sleep/wake intervals for the transceiver during the 60-minute time period can be set to coordinate with the second device coverage interval(s) for the first devices 102.

In this example, the sleep and wake intervals of the first device 102 are set to coincide with the coverage interval(s) 202, 204, such that the first device 102 is awake during the entire coverage interval(s) 202, 204 and sleeping throughout the entire non-coverage interval(s). From time=0 to time=15 minutes, the first device 102 is in a non-coverage interval and the first transceiver is in a sleep interval 210. At time=15 minutes, a coverage interval 202 for the first device 102 begins, and the first transceiver transitions from sleep interval 210 to an awake interval 206. The awake interval 206 coincides with the coverage interval 202, such that the awake interval 206 begins and ends at the same times that the coverage interval 202 begins and ends. Thus, the first transceiver is awake from time=15 minutes to time=30 minutes, and the coverage interval 202 occurs from time=15 minutes to time=30 minutes. At time=30 minutes, the coverage interval 202 ends, starting a non-coverage interval. At time=30 minutes, the first transceiver transitions from awake to sleep, starting a fifteen-minute sleep interval 212. The sleep interval 212 occurs for 15 minutes during the 15-minute non-coverage interval. At time=45 minutes, the next coverage interval 204 begins, and the first transceiver transitions from the sleep interval 212 to an awake interval 208. The awake interval 208 coincides with the coverage interval 204 and ends when the coverage interval 208 ends at time=60 minutes.

Figure 3:
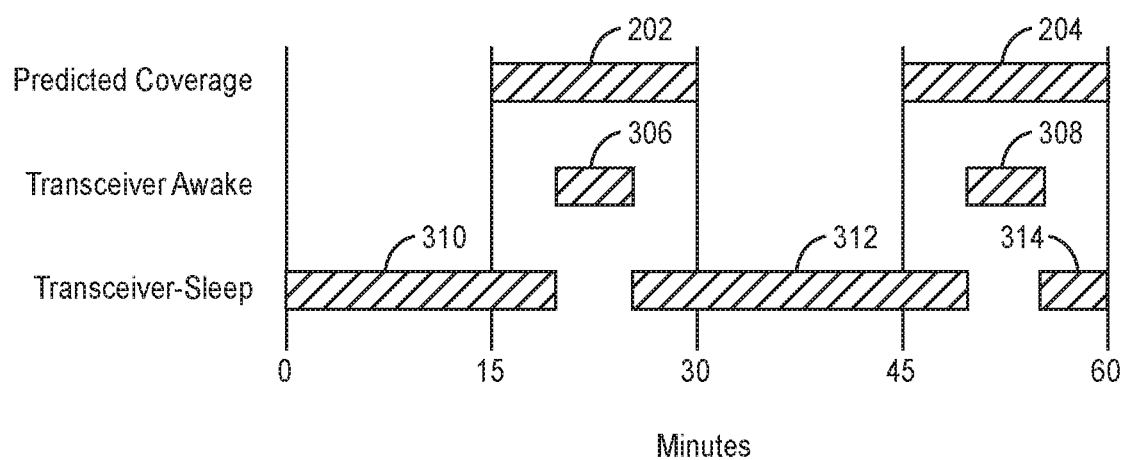
FIG. 3 is a graph illustrating other example sleep and wake intervals for the first communication device of FIG. 1 with respect to coverage intervals of the second communication device of FIG. 1.

FIG. 3 is a graph illustrating other example sleep and wake intervals for the first device 102 with respect to the second device coverage intervals 202, 204. In this example, the coverage intervals 202, 204 for the first device 102 are the same as the example of FIG. 2, being periodic based on a looping path of the second device 104. In the example of FIG. 3, the awake intervals 306, 308 for the transceiver of the first device 102 occur entirely within a coverage interval 302, 304, but the awake intervals 306, 308 do not coincide with the start and end of the coverage intervals 202, 204. Instead, the awake intervals 306, 308 are set to occur for a lesser length of time than the coverage intervals 202, 204. The transceiver may be set to wake for a lesser length of time than the coverage intervals 202, 204 occur, if less than the full duration of a coverage interval 202, 204 is needed to communicate the desired information, and/or to use less power than would be required if the transceiver were awake for the full coverage interval 202, 204.

At time=0, the first device 102 is in a non-coverage interval and the transceiver of the first device 102 is in a sleep interval 310. At time=15 minutes, the coverage interval 202 starts and continues until time=30 minutes. Even though the coverage interval 202 starts at time=15 minutes, the transceiver remains in the sleep interval 310 past time=15 minutes up to time=20 minutes. At time=20 minutes, the transceiver transitions to an awake interval 306. The awake interval 306 lasts for five minutes, so at time=25 minutes the transceiver transitions from awake to sleep. Thus, the transceiver transitions to awake after the start of the coverage interval 202 and transitions back to sleep prior to the end of coverage interval 202. The sleep interval 312 occurs from time=25 minutes to time=50 minutes. At time=30 minutes the coverage interval 202 ends, beginning a non-coverage interval. That non-coverage interval continues until time=45 minutes. At time=45 minutes, another coverage interval 204 begins. That coverage interval 204 occurs from time=45 minutes to time=60 minutes. During that 15-minute coverage interval 204, the transceiver awakes for a 5-minute wake interval 308. Specifically, the sleep interval 312 ends at time=50 minutes and an awake interval 308 begins. The awake interval 308 ends at time=55 minutes and another sleep interval 314 begins.

In both the examples of FIG. 2 and FIG. 3, the awake intervals 206, 208, 306, 308 are set to occur during a coverage interval 202, 204, 302, 304. In particular, the entire duration of each awake interval 206, 208, 306, 308 occurs during a coverage interval for the first device 102. This makes efficient use of energy by ensuring that the transceiver is only awake while the second device 104 is in communication range. Additionally, in both the examples of FIG. 2 and FIG. 3, the transceiver is set to sleep throughout all of the non-coverage intervals, ensuring that the transceiver does not waste energy trying to communicate with the second device 104 while the second device 104 is out of range. In other examples, other durations of sleep/wake intervals can be used, and/or different durations of wake intervals can be used during different coverage intervals. For example, a first wake interval of 15 minutes can be used during the first coverage interval 202 and a second wake interval of 5 minutes can be used during the second coverage interval 204.

Figure 4:
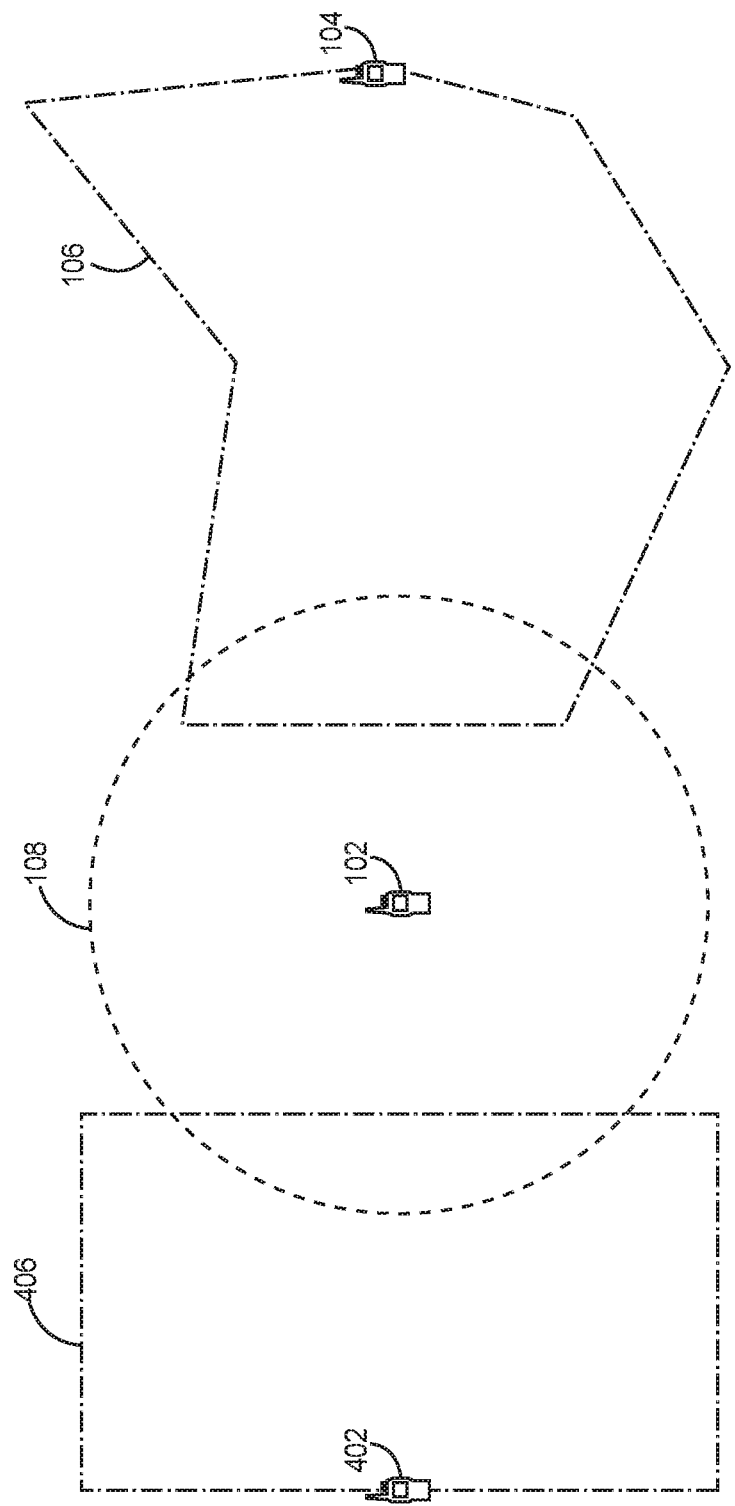
FIG. 4 is a block diagram of the first communication device, the second communication device, and an example third communication device.

FIG. 4 is a block diagram of the first device 102, the second device 104, and an example third device 402. In this example, the first device 102 is again generally stationary, while the second device 104 and the third device 402 travel in respective loops around paths 206, 406. The paths 206, 406 take the second device 104 and the third device 106 into and out of communication range 208 with the first device 102.

Figure 5:
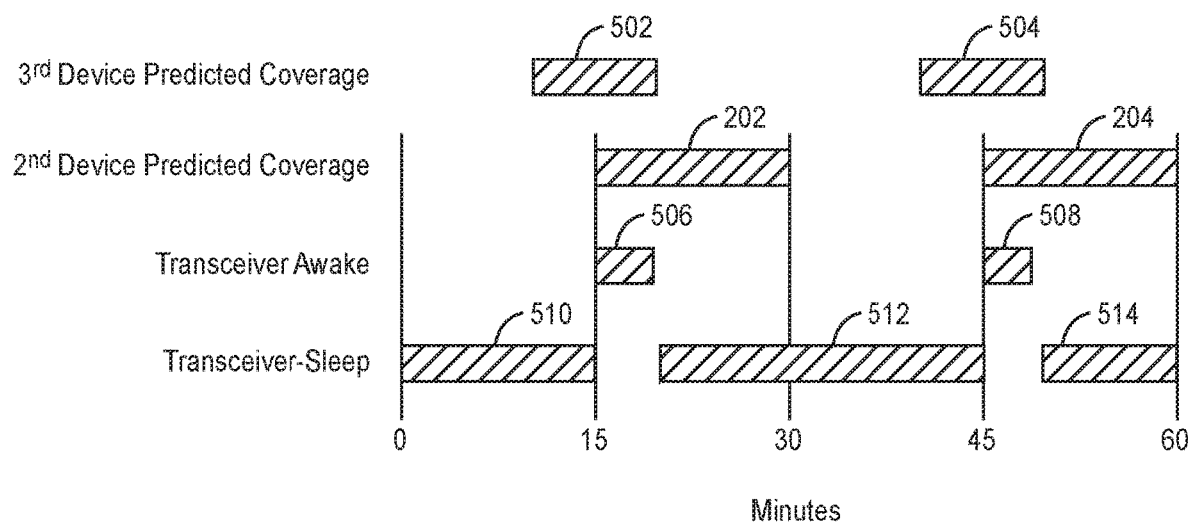
FIG. 5 is a graph illustrating example sleep/wake intervals for the first communication device with respect to the coverage intervals of the second communication device and third communication device of FIG. 4.

FIG. 5 is a graph illustrating example coverage intervals and sleep/wake intervals for the first device 102. In this example, the sleep/wake intervals for the transceiver of the first device 102 are set based on coverage intervals of more than one device. In the example of FIGS. 4 and 5, it is desired that the first device 102 be able to communicate with both the second device 104 and the third device 402. Accordingly, the second device coverage intervals 202, 204 as well as the third device coverage intervals 502, 504 for the first device 102 are determined. As shown, the second device coverage interval 202 begins at time=15 minutes and occurs for 15 minutes until time=30 minutes. A third device coverage interval 502 begins at time=10 minutes and occurs for 10 minutes until time=20 minutes. In this example, the second device coverage interval 202 and the third device coverage interval 502 overlap during the period of time=15 minutes until time=20 minutes. If the first device 102 only needs to communicate with the second device 104 and the third device 402 for a total of 5 minutes every 30 minutes, then the transceiver of the first device 102 can be scheduled for a wake interval 510 during the period between time=15 minutes to time=20 minutes. During this wake interval 510, the first device 102 can communicate with both the second device 104 and the third device 402. During the time period between time=0 minutes and time=15 minutes, the transceiver of the first device 102 can be in a sleep interval 512. During the time period between time=20 minutes and time=45 minutes, the first device 102 can be in another sleep interval 514.

Similarly, the transceiver of the first device 102 can have a sleep interval from time=20 minutes to time=45 minutes. At time=45 minutes, the transceiver can have an awake interval 508 during a time in which both the second device 104 and the third device 402 are again within communication range—during period in which a second device coverage interval 204 and a third device coverage interval 504 overlap. The awake interval 508 can end at time=50 minutes to begin another sleep interval 514 from time=50 minutes to time=60 minutes.

Figure 6:
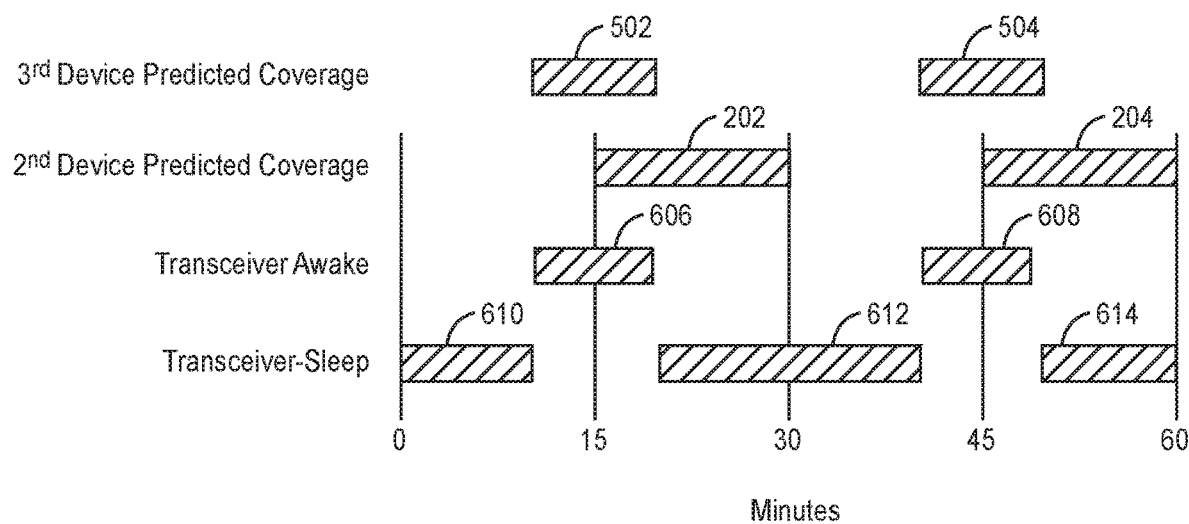
FIG. 6 is a graph illustrating other example sleep/wake intervals for the first communication device with respect to the coverage intervals of the second communication device and third communication device of FIG. 4.

FIG. 6 is a graph illustrating other example sleep/wake intervals for the first device 102 to communicate with the second device 104 and the third device 402. In the example of FIG. 6, the coverage intervals 202, 204, 502, 504 are the same, but it is desired that the first device 102 communicate with the second device 104 and the third device 402 for at least 5 minutes each. To accomplish this, a first wake interval 606 for the first device 102 is set to start at time=10 minutes and end at time=20 minutes. Thus, the first device 102 has at least 5 minutes of communication time available with each of the second device 104 and the third device 402. The first device 102 has a first sleep interval 610 from time=0 to time=10 minutes and a second sleep interval 612 from time=20 minutes to time=40 minutes. A second wake interval 608 starts at time=40 minutes and continues until time=50 minutes. At time=50 minutes, a third sleep interval 614 begins.

The sleep/wake intervals for a first device can be scheduled based on the coverage intervals of any number of other devices. Moreover, the sleep/wake intervals for a first device can be scheduled based on the coverage intervals of all (known) possible other communication devices (i.e., the other communication devices that come into range at least once during a scheduling period) or based on the coverage intervals of a subset of the possible other communication devices. Scheduling based on all possible other communication devices may be desirable to ensure the first device is able to communicate with any of the other communication devices. Scheduling based on a subset of the possible other communication devices, may enable the first device to be awake less and enable the first device to focus its energy resources on the devices with which communication is most desirable.

The sleep/wake intervals can apply solely to the transceiver of the first device 102, such that other components of the first device 102 can remain operational during a sleep interval of the transceiver, and other components of the first device can sleep during an awake period of the transceiver. In an alternative example, the entire first device 102 can go into a sleep state during a sleep interval.

The transceiver of the first device 102 can remain completely off throughout an entire sleep interval. That is, no beaconing or other transmission or receptions by the transceiver occur during sleep. Since the desired communication of the first device 102 is factored a priori into the sleep/wake intervals, one can be comfortable that the first device 102 will not be missing any communications during a sleep interval. Thus, the transceiver can remain completely off during the sleep intervals.

In an example, the transceiver can refrain from transmitting a high-power beacon to identify other communication devices in range at the start of, or anytime during, some or all of its wake intervals. Prior art devices are oftentimes programmed to transmit one or more beacon signals at high-power upon waking from sleep in order to solicit responses from, and thereby discover, other devices within communication range. In the examples described herein, however, at least some of the future locations of devices with which a first device desires to communicate are known a priori. In such an example, instead of sending out a high-power beacon to discover nearby devices, the first device can passively wait to receive a beacon from the device(s) to which it will be connecting. Eliminating the high-power beacon can further save battery power of the first device. In other example, a mid or lower power beacon for discovering other devices can be transmitted.

As mentioned above, the sleep/wake intervals for a first device can be scheduled based on the coverage prediction for the first device. The coverage prediction for the first device can include a set of coverage intervals for the first device, the set of coverage intervals including the coverage intervals for each other device with which it is desired that the first device communicate. Based on the coverage prediction and other factors, a sleep/wake schedule for the first device can be determined. The other factors can include the desired rate of power drain, a desired duration and/or frequency of communication with one or more of the other devices, and others. In any case, taking the coverage prediction and the other factors into consideration a sleep/wake schedule for the first device can be developed. The sleep/wake schedule can include the times in which to have a transceiver of the first device 102 sleep and be awake (i.e., the time and duration of the sleep intervals and the time and duration of the awake intervals). The times for the sleep and wake intervals can be indicated in any suitable form, including as a device relative time that is a time with respect to a device time of the first device, or as a globally referenced time, which is a time with respect to a global time (e.g., with respect to GMT).

The device(s) with which a first device 102 communicates (e.g., the second device 104, third device 402) can also have sleep/wake schedules based on the coverage predictions. For example, if the second device 104 only communicates with the first device 102, the sleep/wake intervals of the second device 104 can be scheduled such that the second device 104 is awake while the first device 102 is in communication range and asleep while the first device 102 is out of communication range. In other examples, some or all of the device(s) with which a first device 102 communicates do not have sleep/wake schedules based on coverage predictions. The devices can, for example, be awake and able to communicate at all times.

The coverage prediction and the sleep/wake schedule for the first device 102 can be generated by any appropriate device. In an example, the first device 102 can determines its own coverage prediction and sleep/wake schedule. In another example, another device can generate the coverage prediction and the sleep/wake schedule for the first device 102. Such an other device can be a remote computing device that executes a planning module which generates coverage predictions and sleep/wake schedules for multiple communication devices.

Figure 7:
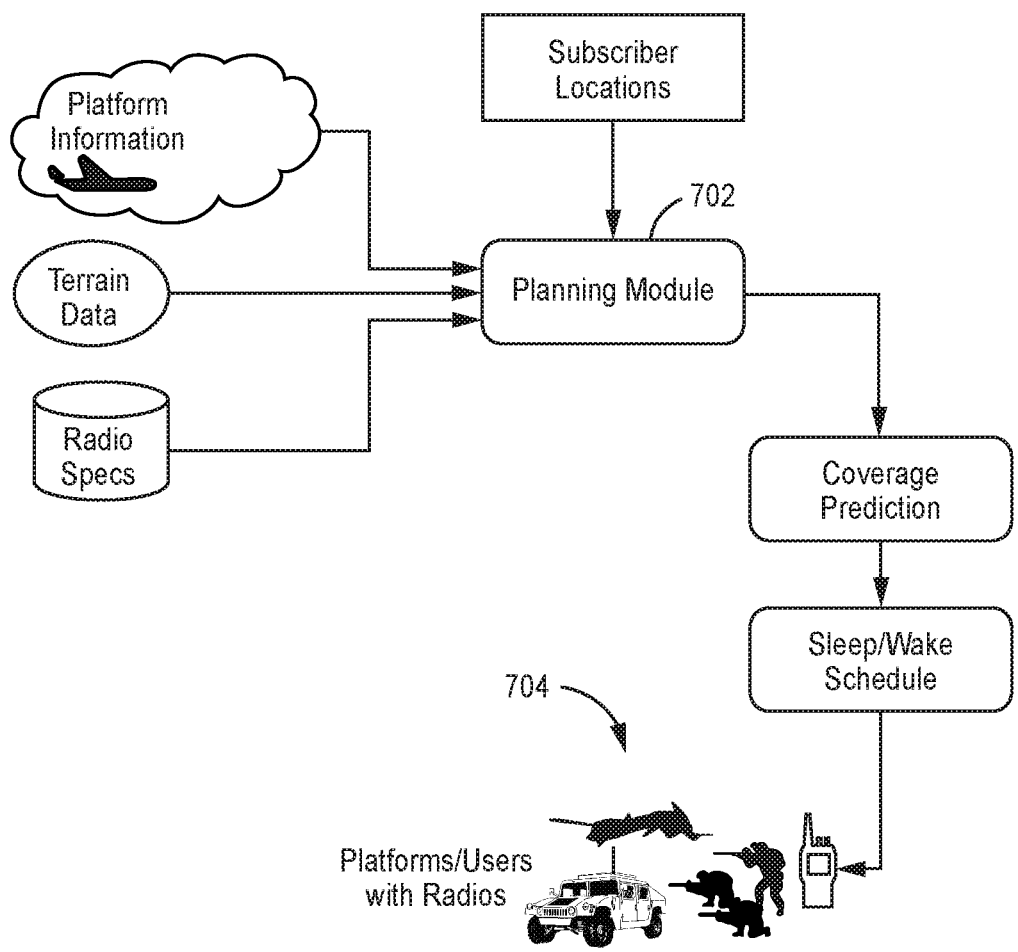
FIG. 7 is a functional diagram of an example planning module that generates coverage predictions and sleep/wake schedules for a plurality of communication devices.

FIG. 7 is a functional diagram of an example planning module 702 that generates coverage predictions and sleep/wake schedules for a plurality of communication devices 704. The planning module 702 is software that executes on one or more computing devices to generate the coverage predictions and sleep/wake schedules. In an example, the planning module 702 operates on one or more computing devices that are distinct from the plurality of communication devices 702 and transmits the sleep/wake schedules to the communication devices 704. The communication devices 704 can then control their respective transceiver based on the sleep/wake schedule provided. The planning module 702 can generate a distinct sleep/wake schedule for each communication device 704, wherein the sleep/wake schedule for each communication device 704 is customized to that communication device 704.

The communication devices 704 can be any device capable of communicating, such as a mobile phone, mobile communications radio (e.g., tactical radio), a radio platform for installation in heavy equipment (e.g., military equipment, construction equipment), a wireless wearable device, or a wireless sensor. The other device(s) with which a communication device 704 desires to communicate can be any device capable of communicating with the communication device 704. Example other devices include another communicating device 704 having its own sleep/wake schedule, an aerial communication platform, a base station, a communication (e.g., cell) tower, an access point. The communication devices 704 and the other devices can be stationary or mobile devices.

To generate customized/individualized sleep/wake schedules, the planning module 702 can generate individualized respective coverage predictions for each communication device 704. The coverage predictions are generated based on information regarding the predicted future locations of the communication devices 704, predicted future locations (e.g. future paths) of other devices to which the communication devices 704 are to communicate, as well as characteristics of the communication devices 704 and other devices. The characteristics of the communication devices and the other devices can include a communication range, battery power available, rate of battery drain during awake and sleep intervals, length of time in which battery power is to be relied on, as well as other characteristics of the communication devices 704 and the other devices. The coverage predictions can also be based on a respective list of devices with which each of the communication devices 704 is to have access (e.g., to communicate with) as well as a frequency and/or duration of such communication. All of this information can be obtained by the planning module 702 in any suitable manner. For example, a user can input some or all of the information into the planning module 702, some or all of the information can be generated by the planning module 702 or another module, and/or some or all of the information can be received from the communication devices 704 and/or other devices.

In any case, once the planning module 702 has obtained the information, the planning module can generate coverage predictions and sleep/wake intervals based thereon. The sleep/wake intervals generated by the planning module can be transmitted over a network to the communication devices 704. The communication devices 704 can receive the sleep/wake intervals and control their transceivers in accordance therewith.

In an example, the planning module 702 can be implemented on single computing device. In another example, the planning module 702 can be distributed across multiple computing devices, such that portions of the planning module are implemented by the different devices. In an example, one or more of the coverage predictions or sleep/wake intervals can be generated by the communication devices 704 themselves. That is, one or more of the communication devices 704 and/or other devices can include a planning module that generates a coverage prediction and/or sleep/wake intervals for that device 704. In such an example, the communication devices 704 can obtain the information discussed above via user input or from other devices and generate the coverage predictions or sleep/wake intervals accordingly.

Figure 8:
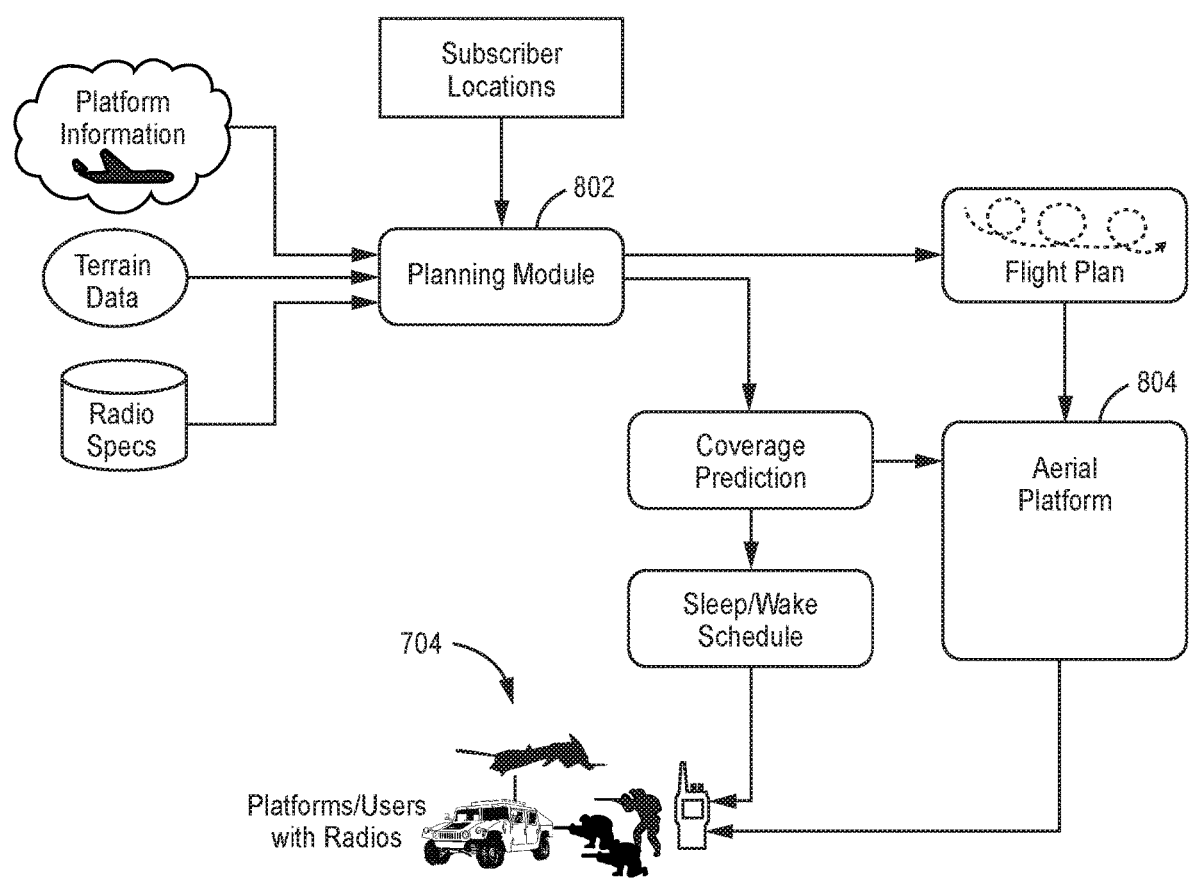
FIG. 8 is a functional diagram of another example planning module that generate flight plans for one or more aerial platforms as well as coverage predictions and sleep/wake schedules for a plurality of communication devices.

FIG. 8 is a functional diagram of another example planning module 802 that generates coverage predictions and sleep/wake schedules for a plurality of communication devices 704. The example planning module 802 generates flight plans for one or more aerial communication platforms 804 that relay communications between the communication devices 704 and one another and/or other networks. The aerial platforms 804 can be aerial communication relays/ network devices implemented in an aerial drone, for example.

The planning module 802 can obtain information regarding the predicted future locations and characteristics of the communication devices 704, the aerial platforms 804, terrain information, and other information. The characteristics of the communication devices 704 and aerial platforms 804 can include a communication range, battery power available, rate of battery drain during awake and sleep intervals, length of time in which battery power is to be relied on, and/or other characteristics. In an example, generating the flight paths can include generating waypoints for the path of the aerial platform 804 and then generating maneuvers for the aerial platform 804 to travel to the waypoints. The result is a path that traverses waypoints using the maneuvers. Once the path and/or waypoints for the aerial platform 804 are generated, the planning module 802 can generate coverage predictions for communication devices 704. The planning module 802 can then generate sleep/wake intervals based on the coverage predictions and send the sleep/wake intervals to the communication devices 704, or the planning module 802 can send the coverage predictions to the communication devices 704 and the communication devices 704 can generate their own sleep/wake intervals.

In an example, the planning module 802 can take into account battery conservation of one or more of the communication devices 704 when generating the flight paths for the aerial platform(s) 804. In an example, the planning module 802 can take into account battery conservation by selecting a path that is closer a communication device 704, not merely within range of the communication device 704. A path that puts an aerial platform 804 closer to a communicating device 704 can reduce the power drained by the communication device 704, because less power is required to transmit shorter distances.

In an example, the sleep/wake schedules for one or more of the communication devices 704 can be updated. The planning module 702, 802 that generated the coverage prediction and/or sleep/wake intervals for the communication device 704 or another device can generate a new coverage prediction and/or new sleep/wake intervals for the communication device 704 based on updated information.

Figure 9:
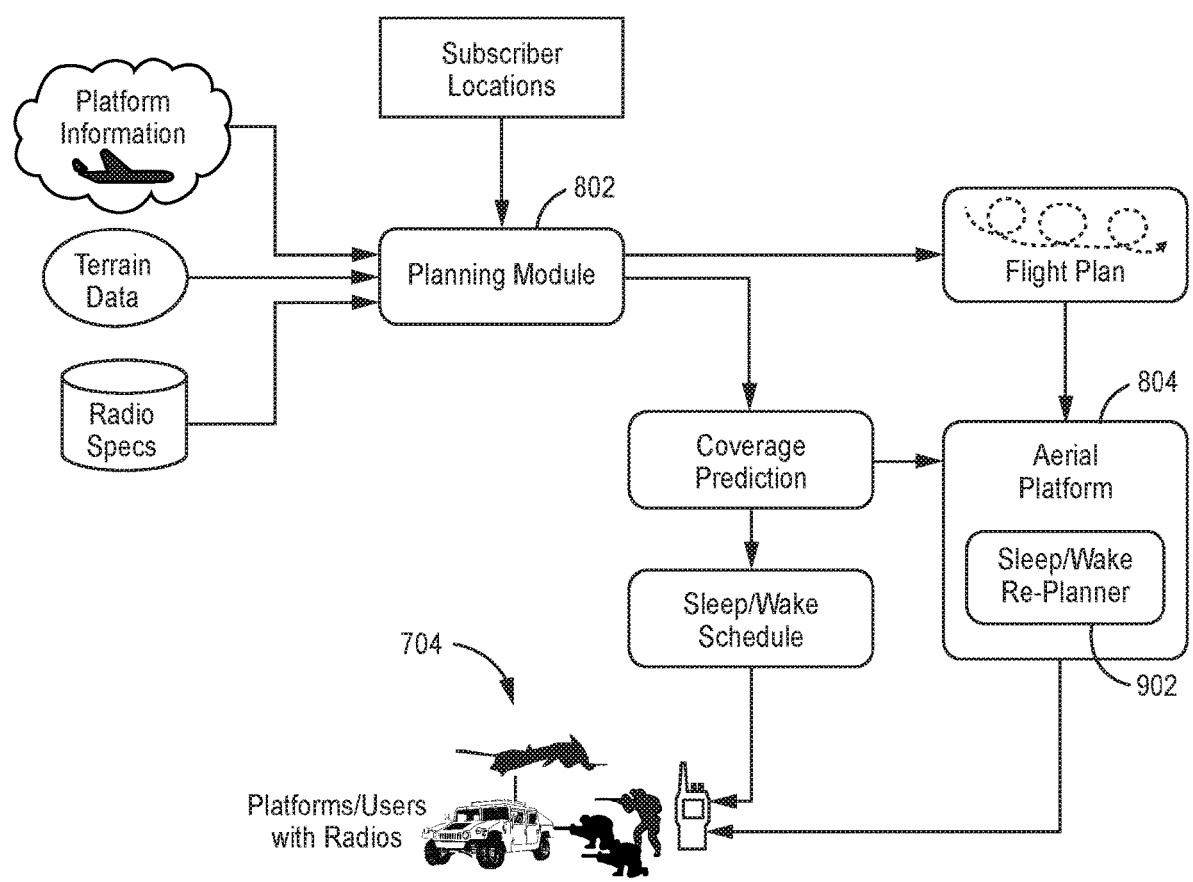
FIG. 9 is a function diagram of the example planning module of FIG. 8 along with an example planning module in aerial platform for updating the sleep/wake intervals of the communication devices.

FIG. 9 is a functional diagram in which the aerial platform 804 generates and sends updated sleep/wake intervals to one or more communication devices 704. In an example, a pre-mission planning module 804 is implemented on a remote computing device and generates coverage predictions and sleep/wake intervals for the communication devices 704 prior to beginning a mission that is to-be performed by the communication devices 704. Once the mission is underway, however, the communication devices 704 may not have communication with the remote computing device. Thus, the aerial platform can generate updated coverage predictions and/or sleep/wake schedules with its own planning module 902 based on updated information it obtains and push the updated sleep/wake schedules to the communication devices 704. In other example, the updated coverage predictions and/or sleep/wake schedules can be generated by the same device that executed the pre-mission planning module 804 or by one or more of the communication devices 704 themselves.

The updated information can include a new predicted path/future location for a communication device 704 or other device (e.g., aerial platform 804), an updated list of devices that a communication device 704 is to communicate with, updated frequency and/or duration of a communication interval, and/or updated characteristics of a device. The updated information can be received by the device generating the coverage prediction and new sleep/wake intervals in any of the manners listed above (e.g., manually, generated within, or received from another device). An updated coverage prediction and/or sleep/wake schedule can be received by one or more communication devices 704, and those devices can update their control to control their transceivers based thereon.

In an example, to facilitate updates or for initial sleep/wake interval or coverage prediction generation, a communication device 704 can provide one-time or repeated (e.g., periodic) information regarding itself to the planning module 702, 802, 902. The information can include a current battery life remaining, a current location, a predicted future path, a predicted future location, or other information.

In an example, sleep/wake intervals can be repeatedly (e.g., periodically) provided to one or more communication devices 704, such that the sleep/wake intervals are continually updated over time. Each sleep/wake interval update can include a minimum of future information for the communication device 704, such that the sleep/wake interval update covers at least a threshold number of wake intervals (e.g., two) or at least a threshold duration of time (e.g., 1 hour). In an example, if a communication device 704 reaches an end of sleep/wake interval schedule (i.e., neither a sleep interval nor a wake interval is schedule for the present time), the communication device 704 can operate in a default mode. The default mode can include any appropriate sleep/wake intervals including constantly awake, a repeating pattern of awake for a length of time and asleep for a length of time, or other intervals. The default mode can also include beaconing to identify communication nodes in range.

In an example, a communication device 704 can receive an input from a user to manually override a sleep or wake interval of a communication device. In response to the input the communication device 704 can enter a different mode in which the sleep/wake intervals are ignored. For example, a communication device 704 can be configured with a manual override button, which wakes the transceiver/communication device 704 if the transceiver/communication device 704 is in a sleep state. In some examples, a transceiver can send out beacons periodically during a manual override of the sleep/wake intervals to discover other devices in range and/or receive updated network information and/or sleep/wake intervals. Such a manual override enables a user to use awake the transceiver if the situation changes from that expected, such that the user would like to use the transceiver during a time previous scheduled for sleep. In an example, the input is a software implemented button (e.g., menu selection, etc.) that can be selected by a user of the communication device. The communication device 704 can also implement a button to exit manual override and return to control according to the sleep/wake intervals.

In an example, some or all of the communication devices 704 can communicate with one another. All or a portion of these communications can be factored into the sleep/wake intervals of the communication devices 704, such that communications devices 704 are awake during coverage intervals of other communication devices 704. In some examples, however, some or all of the communications 704 between peer communication devices can be outside of the scope of the planning module 702, 802, 902, such that the peer communications are not factored into the sleep/wake intervals. In an example, these communications may be outside of the scope of the planning module 702, 802, 902 because the peer devices are frequently in range, so communication during any scheduled wake interval is likely, because the future location of the peer devices is unknown, or for other reasons. In another example, the peer devices 704 are outside the scope of the planning module 702, 802, 902 because the peer devices communicate using a different transceiver than communications with one or more non-peer devices. For example, the peer devices 704 can comprise user communication radios and the non-peer device can be aerial communication platform 804. In such an example, the peer devices 704 can communicate with each other using a first transceiver and can communicate with the aerial communication platform 804 using a second transceiver. In such an example, the sleep/wake intervals generated by the planning module 702, 802, 902 would be for control of the second transceiver in each communication device 704. The first transceiver need not follow the sleep/wake interval.

As mentioned above, the aerial platform 804 can act as a relay for messages between the plurality of devices 704 and other networks. In such an example and where the plurality of devices 704 can communicate with one another using a first transceiver while communications with the aerial platform 804 are with a second transceiver, the plurality of devices 704 can conserve battery power by sharing one or more aerial links to the aerial platform 804. For example, the plurality of devices 704 can route messages to and from the aerial platform 804 through one or more of the devices 704, such that that the one or more devices 704 through which the messages are routed maintain a link (uplink and downlink) with the aerial platform 804 while the other devices 704 can shut down their link with the aerial platform. Thus, instead of all the devices 704 maintaining a separate link with the aerial platform 804, only a subset of the devices 704 do. Additionally, the subset of devices 704 that are maintaining the aerial link, can change (e.g., rotate) over time to spread out the power load across all the devices 704 (e.g., evenly or based on characteristics of the devices). Messages within the group of devices 704 can, for example, be routed using internet protocol (IP).

In an example, the sleep/wake intervals scheduled for the devices 704 can factor in a shared link with the aerial platform 804. The planning module 702, 802, 902 can obtain information, in addition to the information discussed above, regarding which devices 704 are included in a group and what characteristics of links (e.g., bandwidth, redundancy, timing, frequency, etc.) with the aerial platform 804 are desired.

Based on this information, the planning module 702, 802, 902 can schedule which devices 704 implement a shared link with the aerial platform 804 at which time and can schedule the sleep/wake intervals for the second transceivers of those devices 704 in accordance with such a shared link. For example, if a first device 704 is implementing a shared link during a first interval and a second 704 and third device 704 are routing their messages through the first device 704, the sleep/wake schedule can schedule the second transceiver of the first device 704 to have an awake interval during the first interval and the second transceivers of the second 704 and third devices 704 to have a sleep interval during the first interval. While the second transceivers of the second 704 and third devices 704 are asleep, the first transceivers of the first, second, and third devices 704 can transfer message therebetween to enable the messages to utilize the shared link implemented by the first device 704. If the shared link is changed to the second device 704 for a second interval, the second device 704 can have a wake interval during the second interval while the first 704 and third device 704 have a sleep interval. The planning module 702, 802, 902 can implement multiple sleep/wake schedules for one or more groups of devices sharing respective links in this way.

In an example, the planning module 702, 802, 902 can also take into account a relative location of each device 704 in a group relative to the device 704 to which the shared link connects, in order to prioritize selecting devices 704 to implement the shared link that are closer to the device to which the shared link connects while those devices implement the shared link. For example, if both a first device 704 and a second device 704 will be within range of a connecting device during a first time period, but the first device 704 will be closer to the connecting device than the second device 704 (or can otherwise transmit with less power due to other factors such as terrain) during that time period, the planning module 702, 802, 902 can prioritize the first device 704 for implementing the shared link during the first time period. During other time periods other devices may be closer and those devices can be prioritized.

Figure 10:
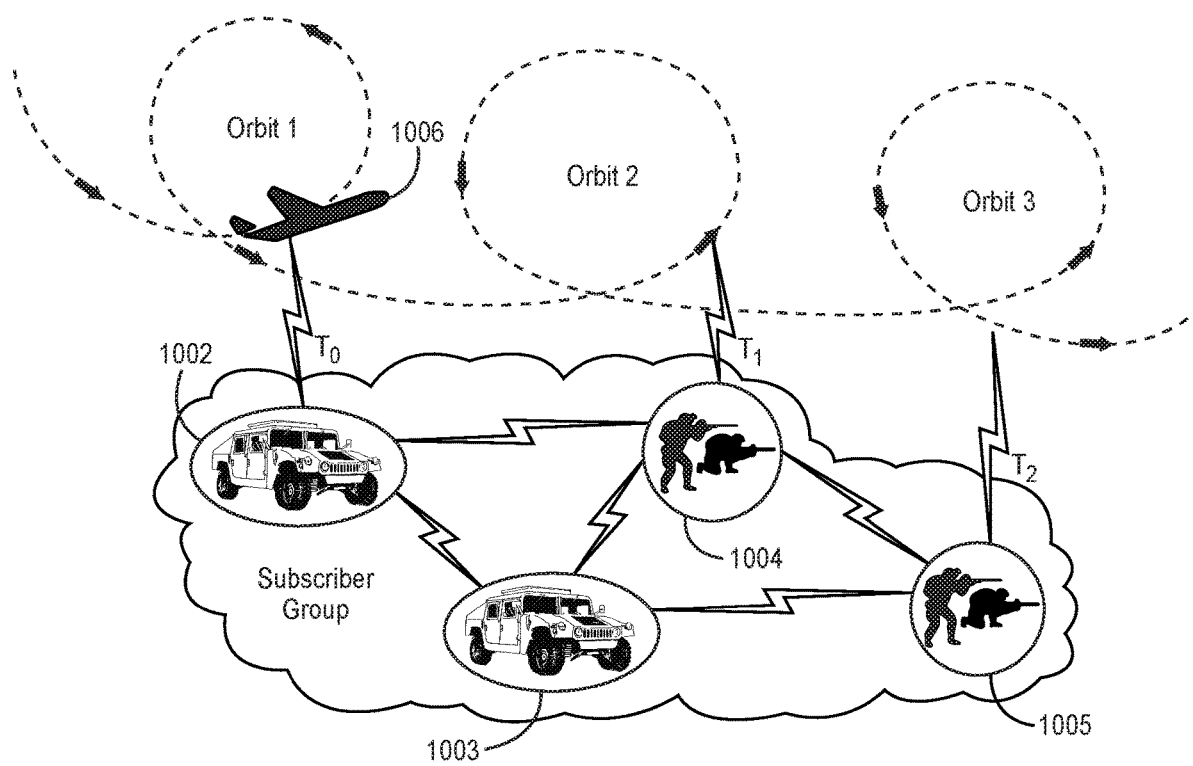
FIG. 10 is a block diagram of an example of a flight plan for an aerial platform that takes into account battery conservation of the communication devices.

FIG. 10 is a block diagram of another example method of generating a flight plan while taking into account battery conservation of the communication devices. In this example, the flight plan of the aerial platform takes into account battery conservation of the communication devices by choosing waypoint(s)/path that provides the desired coverage (e.g., duration, frequency) for communication device(s) that are implementing a shared aerial link with the aerial platform. Communication devices having access to a shared aerial link need not be covered. This can result in efficiencies in the path of the aerial platform, because the path need not cover all devices in a group during a given access interval. If the device implementing the shared aerial link changes over time, the path of the aerial platform can take into account those changes such that during different passes near a group of devices, the aerial platform can take different paths to cover the device that is implementing the aerial link at that time.

For example, a plurality of communication devices 1002, 1003, 1004, 1005 can implement a single shared link to communicate with an aerial platform 1006. The devices 1002, 1003, 1004, 1005 can be configured to change which device 1002, 1003, 1004, 1005 implements the shared link over time. In an example, the aerial platform 1006 can follow a path that generally loops, repeatedly (e.g., periodically) taking the aerial platform 1006 nearby the group of devices 1002, 1003, 1004, 1005. The planning module 702, 802, 902 can obtain information regarding the predicted future locations of the devices 1002, 1003, 1004, 1005 and generate a flight plan for the aerial platform 1006 and sleep/wake intervals for the devices 1002, 1003, 1004, 1005 that are coordinated with one another. The coordinated flight plan and sleep/wake intervals can generate a flight plan that takes the aerial platform 804 within communication range of a first device 1002 during a first interval when the first device 1002 is implementing the shared aerial link for the group, within communication range of a second device 1004 during a second interval when the third device 1004 is implementing the shared aerial link for the group, and within communication range of a fourth device 1005 during a second interval when the fourth device 1005 is implementing the shared aerial link for the group. The coordinated flight plan and sleep/wake intervals can also have the second transceivers of each device 1002, 1003, 1004, 1005 that is not implementing the shared link sleep and put the second transceivers of all the devices 1002, 1003, 1004, 1005 in a sleep interval while the aerial platform 1006 is out of range. The coordinated flight plan and sleep/wake intervals can also change which device 1002, 1003, 1004, 1005 implements the shared link at the appropriate time, such that the device 1002, 1003, 1004, 1005 that is implementing the shared link is implementing that link at the same time that the aerial platform is schedule to be in communication range of that device 1002, 1003, 1004, 1005.

Figure 11:
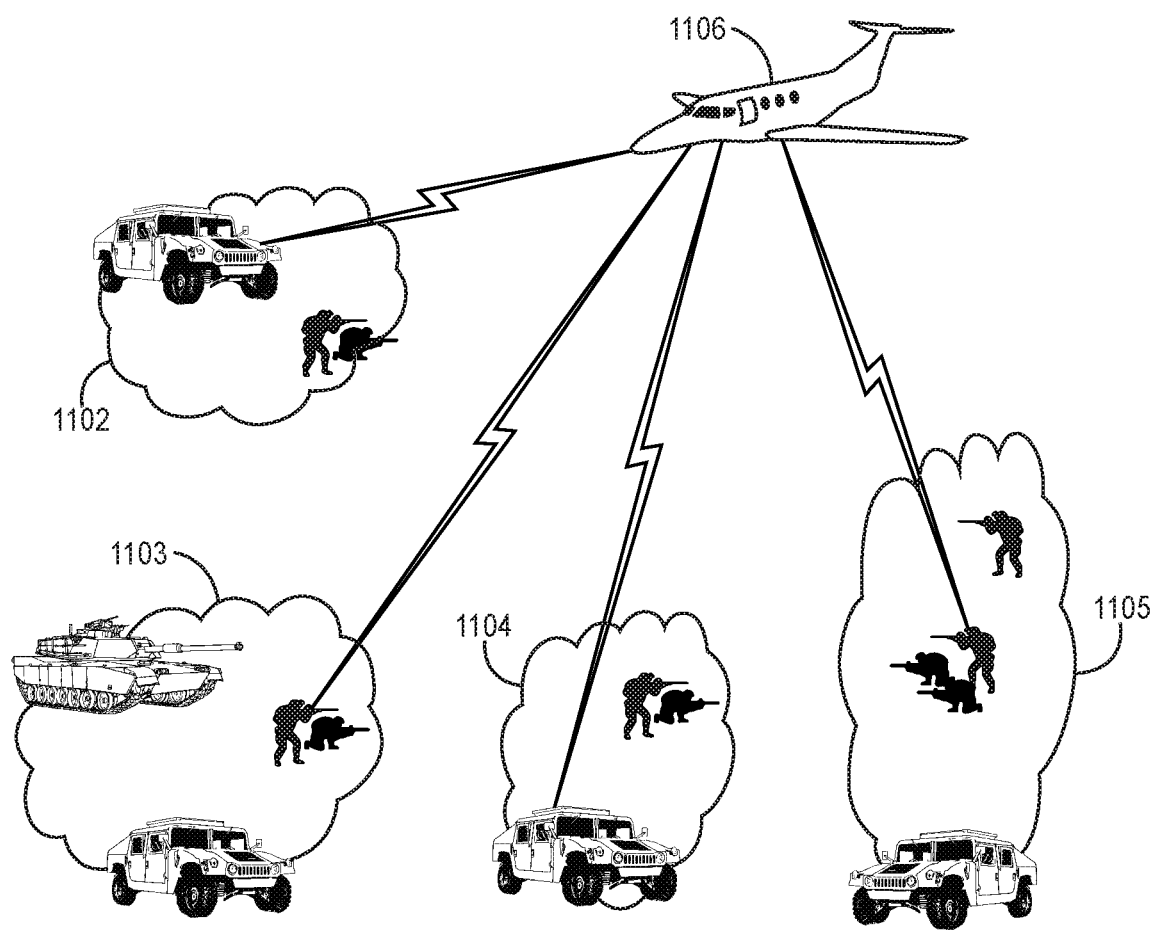
FIG. 11 is a block diagram of another example of a flight path for an aerial platform that takes into account battery conservation of the communication devices.

FIG. 11 is another example of a flight path that takes into account battery conservation of the communication devices. In this example, there are four groups 1102, 1103, 1104, 1105 of communication devices. The planning module obtains information indicating which devices or groups would like to communicate with which other devices or groups and, optionally, the time periods during which those communications are desired. The planning module can then generate a flight plan for the aerial platform 1106 that allows a first device or group to have access to a first aerial link at the same time that a second device or group has access to a second aerial link. The planning module can also ensure that at least one network couples together the first aerial link and the second aerial link, such that the first device or group is communicatively coupled to the second device or group via the first and second aerial links. That is, the aerial link for a first group desiring to communicate with a second group can be implemented by a different aerial platform than the aerial link for the second group, if the first aerial platform and the second aerial are communicatively coupled together (e.g., via network or air-to-air link). In some examples, more than two groups of devices can be coupled together.

The flight path can also take into account a duration, frequency, or other characteristic of the communicative connection between the two devices or groups. For example, if group 1002 would like connection with group 1004 for at least 15 minutes every hour and group 1003 would like connection with group 1005 for at least 15 minutes every hour, the flight path of the aerial platform can ensure at least 15 minutes of concurrent coverage for group 1002 and group 1004 during each hour and at least 15 minutes of concurrent coverage for group 1003 and group 1005 each hour.

An example flight planning module that can be enhanced to take into account conservation of battery power of a communication device is described in U.S. Pat. No. 9,685,088, which is hereby incorporated herein by reference.

Although the above examples describe paths and coverage predictions generated based on a generally stationary communication device communicating with a mobile other node (e.g., aerial platform), the coverage prediction can take into account mobility of a communication node as well, and/or the other node with which a communication device is communicating can be generally stationary. For example, a mobile communicating device can periodically come within range of a stationary access point, such that the coverage prediction for the mobile communicating device indicates coverage during the periods in which the mobile communicating device moves into range of the stationary access point, and sleep/wake intervals for the mobile communicating device awake a transceiver of the mobile communicating device during the interval(s) that it is in range of the access point and sleep the transceiver of the mobile communicating device during the interval(s) that it is out of range of the access point.

The threshold for when two devices are in communication range of one another can be determined in any appropriate manner. Moreover, different pairs of devices can have different thresholds for what is in and out of communication range or all pairs of devices can use the same threshold. The threshold can be the minimum signal level required to establish a link, can be a minimum link quality (e.g., minimum bandwidth, minimum signal to noise ratio, minimum bit error rate), or other factor.

In an example, the communication devices and any device implementing a planning module can communicate sleep/wake interval or coverage prediction information in accordance with a sleep/wake communication protocol. Each such communication device or other device can be configured to communicate in accordance with a common sleep/wake communication protocol enabling devices to easily communicate sleep/wake interval or coverage prediction information with each other. The sleep/wake communication protocol can have any appropriate characteristics. In an example, the sleep/wake communication protocol is based on IPv4/IPv6 protocols and includes an authentication mechanism that ensures that only authorized entities can set sleep/wake intervals for a communication device. In an example, each communication device can synchronize time using, for example, a global navigation satellite service such as GPS, or a network-based time protocol such as (NTP).

Figure 12:
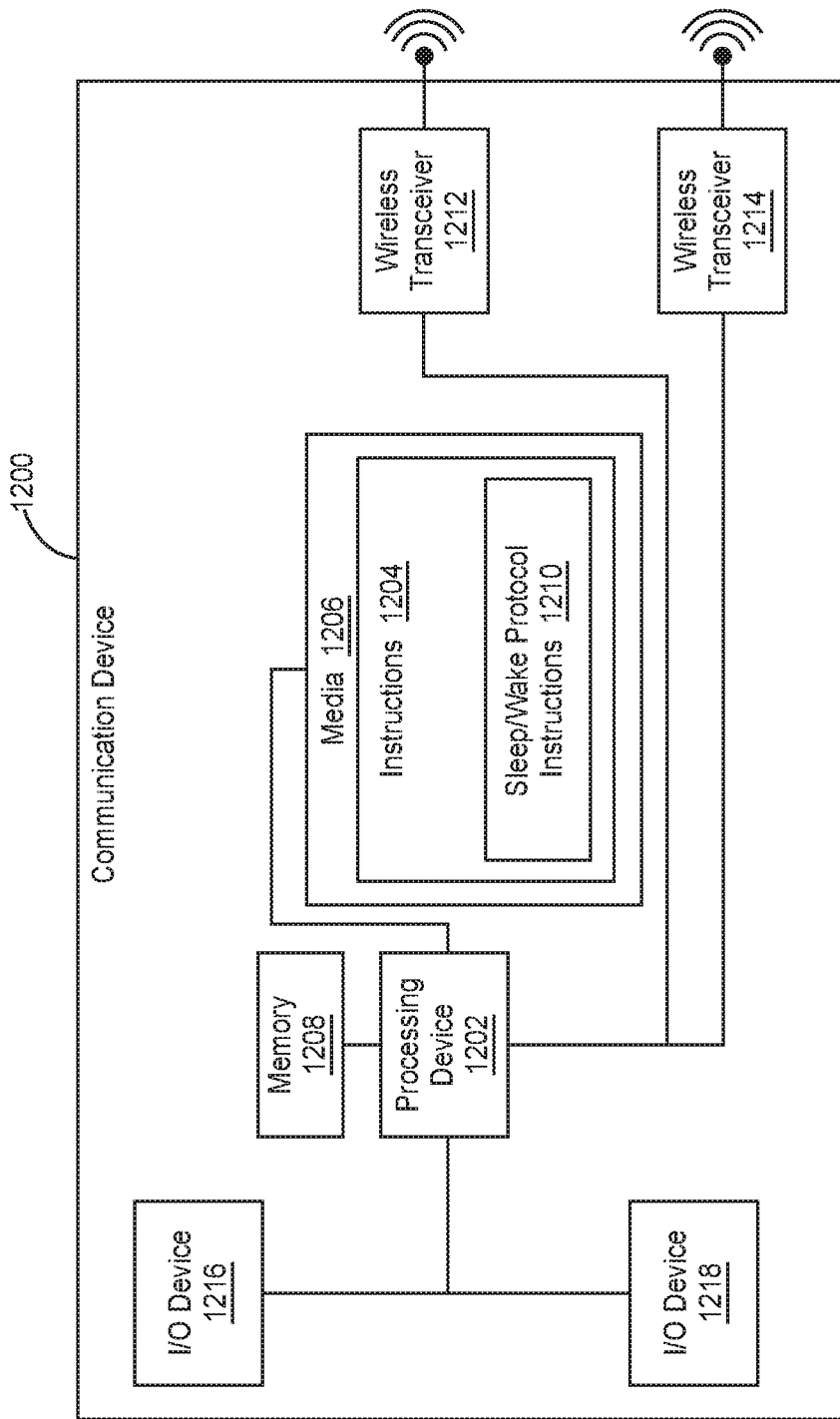
FIG. 12 is a block diagram of an example communication device having sleep/wake protocol instructions loaded thereon.

FIG. 12 is a block diagram of an example communication device 1200 having sleep/wake protocol software 1210 therein. The communication device 1200 can be any communications device that controls its transceiver in accordance with the sleep/wake intervals discussed herein. The communication device includes one or more processing devices 1202 for executing instructions 1204. The instructions 1204 are stored (or otherwise embodied) on or in an appropriate storage medium or media 1206 (such as flash or other non-volatile memory) from which the instructions 1204 are readable by the processing device(s) 1202 for execution thereby. The communication device 1200 also includes memory 1208 that is coupled to the processing device(s) 1202 for storing instructions (and related data) during execution by the processing device(s) 1202. Memory 1208 comprises, in one implementation, any suitable form of random access memory (RAM) now known or later developed, such as dynamic random-access memory (DRAM). In other implementations, other types of memory are used. The one or more processing devices 1202 is coupled to a first wireless transceiver 1212 and a second wireless transceiver 1214 for transmitting and receiving wireless signals with other devices as described herein.

The instructions 1204 include the sleep/wake protocol instructions 1210. The sleep/wake protocol instructions 1210, when executed by the one or more processing devices 1202, can cause the communication device 1200 to perform the actions of a communication device described herein. In particular, the sleep/wake protocol instructions 1210 can cause the processing devices 1202 to control the second transceiver 1214 to sleep and wake in accordance with the sleep/wake intervals of a sleep/wake schedule as discussed herein. The instructions 1204 can also include the other instructions which, when executed by the one or more processing devices 1202, cause the communication device 1200 to perform other actions as desired. The one or more processing devices 1202 are also coupled to one or more input/output (I/O) devices 1216, 1218 for receiving input from, or providing input to, a user. The I/O device(s) 1216, 1218 can include any suitable I/O device such as a keyboard, display screen, touchscreen, mouse, touchpad, microphone, etc.

In an example, the sleep/wake protocol software for executing the sleep/wake intervals and related functions on a communication device can be a software product. The software product can include sleep/wake protocol instructions 1210 that are stored or otherwise embodied on a computer readable medium that is distinct from any processing devices, memory, and other associated hardware. Such sleep/wake protocol instructions 1210 can be loaded onto an appropriate hardware device, such as the hardware device shown in FIG. 12, such that that hardware device implements the sleep/wake interval functions described herein. The computer readable media on which the sleep/wake protocol instructions 1210 are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

A planning module software product can also be provided. The planning module software product can include planning module instructions that are stored or otherwise embodied on a computer readable medium that is distinct from any processing devices, memory, and other associated hardware. The planning module instructions can be loaded onto an appropriate hardware device (e.g., desktop, laptop, aerial platform, communication device), such that the hardware device implements the functions of the planning module described herein. The computer readable media on which the planning module instructions are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

What is claimed is:

1. A module for scheduling sleep/wake intervals for a first one or more communication devices, the module comprising:
    a computer readable medium having instructions thereon, the instructions, when executed by one or more processing devices, cause the one or more processing devices to:
        obtain a coverage prediction for the first one or more communication devices, the coverage prediction indicating a start and an end of at least one future interval during which a second one or more communication devices are predicted to be within range of the first one or more communication devices, wherein the second one or more communication devices are one or more flying communication platforms; and
        generate at least one future sleep interval having a start and an end and at least one future wake interval having a start and an end to control the first one or more communication devices based on the coverage prediction.

2. The module of claim 1, wherein obtain a coverage prediction includes generate the coverage prediction based on predicted future locations of the first one or more communication device and the second one or more communication devices.

3. The module of claim 2, wherein the first one or more communication devices include a first plurality of communication devices,
    wherein generate the coverage prediction includes generate a respective coverage prediction for each of the first plurality of communication devices, each coverage prediction indicating intervals during which at least one of the second one or more communication devices is predicted to be within range of a respective one of the first plurality of communication devices.

4. The module of claim 1, wherein generate at least one future wake interval includes schedule the at least one future wake interval such that the at least one future wake interval occurs while a corresponding communication device of the first one or more communication devices is predicted to be within communication range of at least one of the second one or more communication devices.

5. The module of claim 1, wherein generate at least one sleep interval includes schedule the at least one future sleep interval such that the at least one future sleep interval occurs while a corresponding communication device of the first one or more communication devices is predicted to be out of range of all the second one or more communication devices.

6. The module of claim 1, wherein the instructions cause the one or more processing devices to:
    generate one or more flight paths for the second one or more communication devices, wherein generate the one or more flight paths factors in which of the first one or more communication devices are predicted to communicate with each other, such that the one or more flight paths bring the second one or more communication devices in communication range of devices concurrently, if those devices are predicted to communicate with each other.

7. The module of claim 1, wherein the instructions cause the one or more processing devices to:
    generate one or more flight paths for the second one or more communication devices, wherein generate the one or more flight paths factors in which of the first one or more communication devices are implementing a shared aerial link, such that the one or more flight path bring the one or more second communication devices in communication range of a device implementing a shared aerial link while that device is implementing the shared aerial link.

8. A method for scheduling sleep/wake intervals for a first one or more communication devices, the method comprising:
    obtaining a coverage prediction for the first one or more communication devices, the coverage prediction indicating a start and an end of at least one future interval during which a second one or more communication devices are predicted to be within range of the first one or more communication devices, wherein the second one or more communication devices are one or more flying communication platforms; and
    generating at least one future sleep interval having a start and an end and at least one future wake interval having a start and an end to control the first one or more communication devices based on the coverage prediction.

9. The method of claim 8, wherein obtaining a coverage prediction includes generating the coverage prediction based on predicted future locations of the first one or more communication devices and the second one or more communication devices.

10. The method of claim 9, wherein the first one or more communication devices include a first plurality of communication devices,
    wherein generating the coverage prediction includes generating a respective coverage prediction for each of the first plurality of communication devices, each coverage prediction indicating intervals during which at least one of the second one or more communication devices is predicted to be within range of a respective one of the first plurality of communication devices.

11. The method of claim 8, wherein generating at least one future wake interval includes scheduling the at least one future wake interval such that the at least one future wake interval occurs while a corresponding communication device of the first one or more communication devices is predicted to be within communication range of at least one of the second one or more communication devices.

12. The method of claim 8, wherein generating at least one future sleep interval includes scheduling the at least one future sleep interval such that the at least one future sleep interval occurs while a corresponding communication device of the first one or more communication devices is predicted to be out of range of all the second one or more communication devices.

13. The method of claim 8, the method comprising:
generating one or more flight paths for the second one or more communication devices, wherein generating the one or more flight paths factors in which of the first one or more communication devices are predicted to communicate with each other, such that the one or more flight paths bring the second one or more communication devices in communication range of devices concurrently, if those devices are predicted to communicate with each other.

14. The method of claim 8, the method comprising:
generating one or more flight paths for the second one or more communication devices, wherein generating the one or more flight paths factors in which of the first one or more communication devices are implementing a shared aerial link, such that the one or more flight path bring the one or more second communication devices in communication range of a device implementing a shared aerial link while that device is implementing the shared aerial link.

15. A method for scheduling sleep/wake intervals for a first one or more communication devices, the method comprising:
generating a coverage prediction for the first one or more communication devices, the coverage prediction indicating a start and an end of at least one future interval during which a second one or more communication devices are predicted to be within range of the first one or more communication devices, wherein the second one or more communication devices are one or more flying communication platforms;
generating at least one future sleep interval having a start and an end and at least one future wake interval having a start and an end to control the first one or more communication devices based on the coverage prediction;
sending indications of the sleep intervals and wake intervals to the first one or more communication devices; and
controlling sleep/wake of the first one or more communication devices in accordance with the sleep intervals and wake intervals.

16. The method of claim 15, wherein generating includes generating the coverage prediction based on predicted future locations of the first one or more communication device and the second one or more communication devices.

17. The method of claim 15, wherein the first one or more communication devices include a first plurality of communication devices;
wherein generating the coverage prediction includes generating a respective coverage prediction for each of the first plurality of communication devices, each coverage prediction indicating intervals during which at least one of the second one or more communication devices is predicted to be within range of a respective one of the first plurality of communication devices.

18. The method of claim 15, wherein generating at least one future wake interval includes scheduling the at least one future wake interval such that the at least one future wake interval occurs while a corresponding communication device of the first one or more communication devices is predicted to be within communication range of at least one of the second one or more communication devices.

19. The method of claim 15, wherein generating at least one future sleep interval includes scheduling the at least one future sleep interval such that the at least one future sleep interval occurs while a corresponding communication device of the first one or more communication devices is predicted to be out of range of all the second one or more communication devices.

20. The method of claim 15, the method comprising:
generating one or more flight paths for the second one or more communication devices, wherein generating the one or more flight paths factors in which of the first one or more communication devices are predicted to communicate with each other, such that the one or more flight paths bring the second one or more communication devices in communication range of devices concurrently, if those devices are predicted to communicate with each other.

* * * * *